May 28, 1940. H. FANK 2,202,760
CLOVER AND ALFALFA HULLING ATTACHMENT FOR THRESHING MACHINES AND COMBINES
Filed Jan. 19, 1939 3 Sheets-Sheet 2
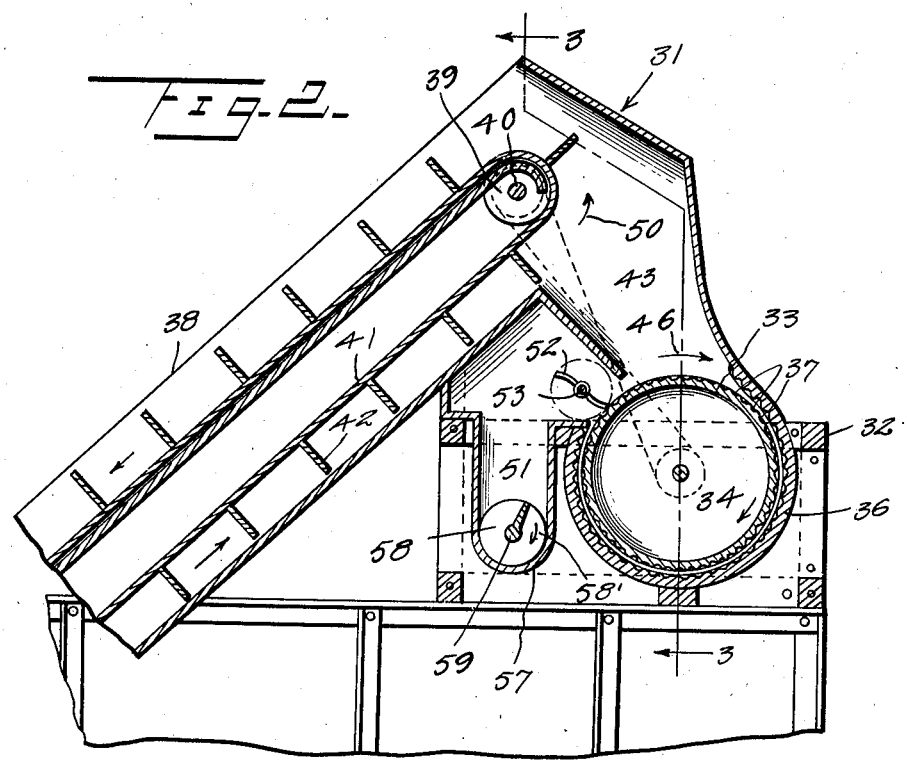
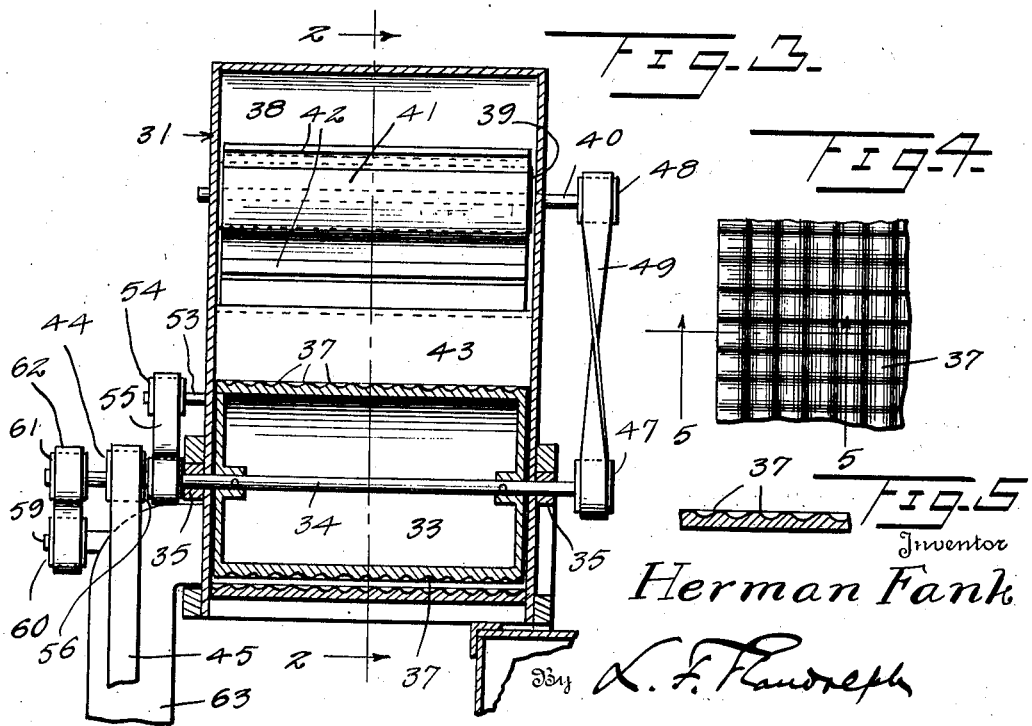
Inventor
Herman Fank
By L. F. Randreth
Attorney

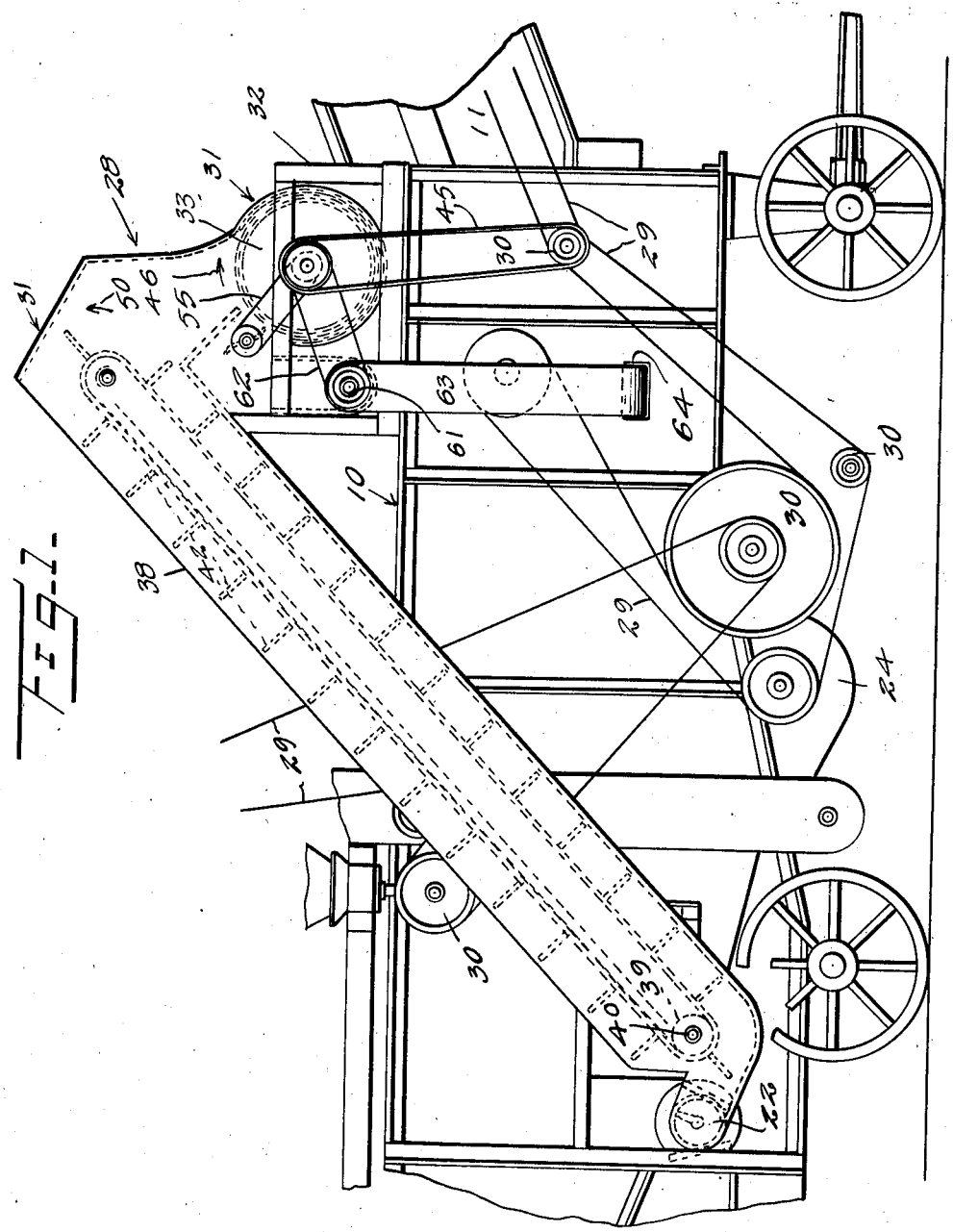

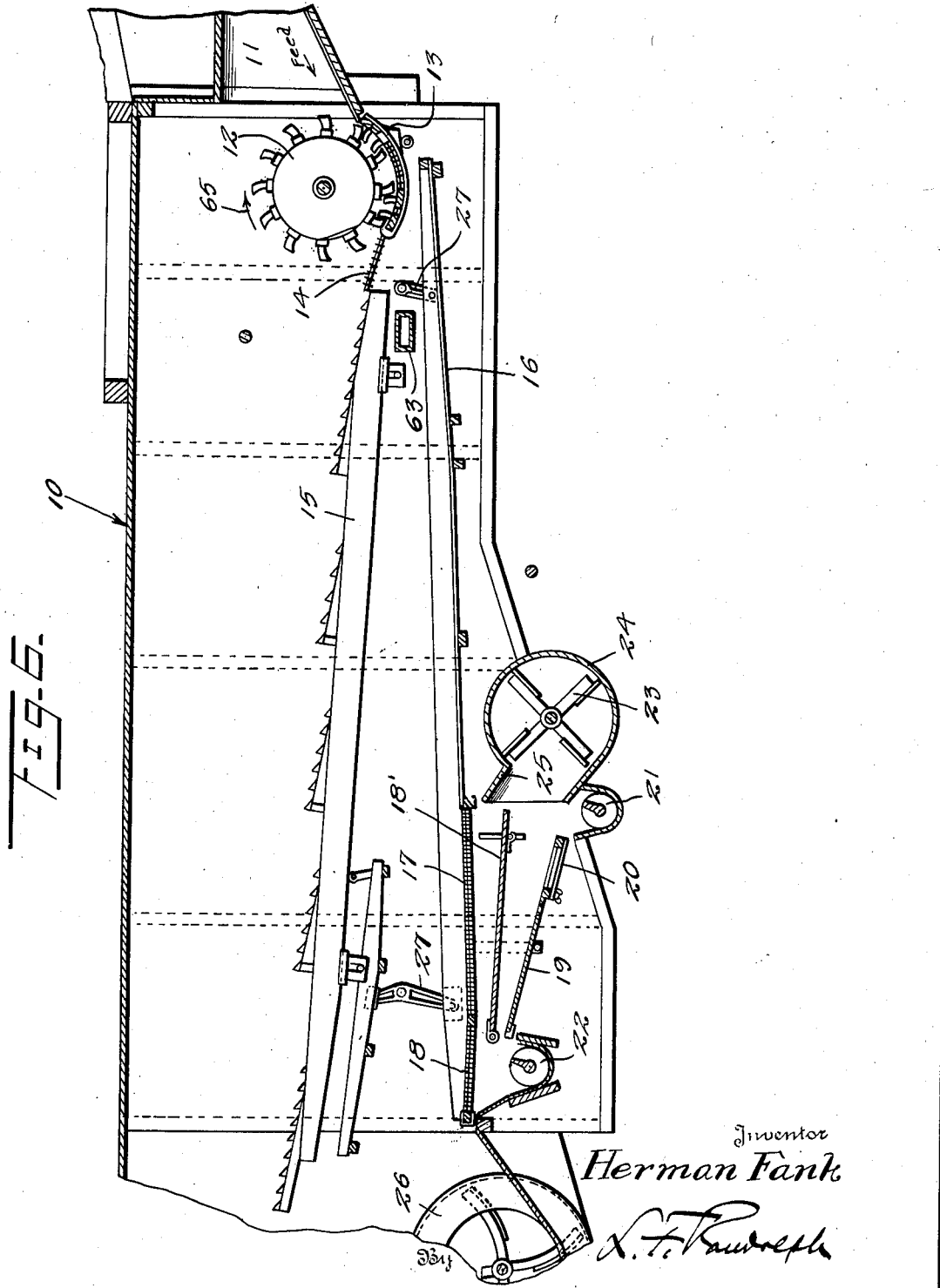

Patented May 28, 1940

2,202,760

UNITED STATES PATENT OFFICE 2,202,760

CLOVER AND ALFALFA HULLING ATTACHMENT FOR THRESHING MACHINES AND COMBINES

Herman Fank, Alden, Iowa

Application January 19, 1939, Serial No. 251,789

3 Claims. (Cl. 130—27)

This invention relates to an improved attachment for threshing machines and combines adapted to break up clover and alfalfa heads to separate the seed from the chaff so that the seed may be divided from the chaff by being again passed through the machine.

More particularly, it is an aim of this invention to provide an attachment adapted to be mounted on a conventional threshing machine or combine, to be actuated by the drive means thereof, and to function in cooperation with the threshing machine or combine when used to thresh clover and alfalfa for separating the seeds from the clover or alfalfa heads.

Still a further aim of the invention is to provide an attachment of simple compact construction capable of being readily applied to or removed from a threshing machine or combine and adapted to function in conjunction therewith when the machine is used for threshing clover or alfalfa whereby the machine may be operated as a means for not only separating the stalks from the heads but for breaking up the heads to separate the seed from the chaff.

Still a further aim of the invention is to provide an attachment for conventional threshing machines or combines for use therewith in threshing clover and alfalfa whereby the clover or alfalfa heads will be passed through the threshing machine or combine, through the attachment to break up the heads to divide the chaff and seeds, and back through the threshing machine or combine for separating the seeds from the chaff.

Other objects and advantages of the invention will hereinafter become more fully apparent from the following description of the drawings, which illustrate a preferred embodiment thereof, and wherein:

Figure 1 is a fragmentary longitudinal side elevational view showing the attachment mounted on a conventional threshing machine or combine and driven therefrom, Figure 2 is a vertical sectional view taken along the line 2—2 of Figure 1, Figure 3 is a transverse vertical sectional view taken along the line 3—3 of Figure 2, Figure 4 is a fragmentary plan view of a portion of the serrated face of the drum, Figure 5 is a sectional view taken along the line 5—5 of Figure 4, and Figure 6 is a longitudinal vertical sectional view of the interior of the threshing machine or combine showing the parts which function in conjunction with the attachment.

Referring more particularly to the drawings, wherein like reference characters designate like or corresponding parts throughout, 10 designates generally a threshing machine or combine of conventional construction, which as seen in Figure 6, is provided with the feed opening or passage 11, the threshing cylinder 12, disposed at the inlet end of the feed passage 11, the concaves 13 disposed beneath cylinder 12 to cooperate therewith, the grill 14 disposed between the concaves 13 and the riddles 15, which extend substantially the length of the machine 10. Beneath the concaves 13, grill 14 and riddles 15 is the grain pan or conveyor 16 at the rear end of which are disposed the sieves or screens 17 and 18. Disposed beneath sieve 17 is the shoe sieve 18', the inclined plate 19 and screen 20, and the grain auger 21. Disposed beneath the screen 18 is the tailings auger 22. A fan or blower 23 is mounted in the casing 24 having the outlet 25 opening between plate 19 and sieve 17. To the rear of the screen 18 and beneath the last of the riddles 15 is shown a portion of the windstacker fan, designated generally 26. These parts are all of conventional construction and are actuated by a shaking motion imparted by the rocker arms 27 in a conventional manner.

The parts heretofore described all function in a conventional manner and have been illustrated and described merely to more clearly set out the manner in which the attachment, designated generally 28, and comprising this invention is intended and adapted to operate in conjunction with a threshing machine or combine, and it is to be understood that the parts shown in Figure 6 are only intended to illustrate one form of a threshing machine or combine with which the attachment 28 may be used.

The various parts of the threshing machine or combine 10 which have heretofore been described are adapted to be actuated by driving means, not shown, through the belts 29 and the pulleys 30, as best seen in Figure 1.

The attachment 28 includes the casing, designated generally 31, which is adapted to be removably mounted on top of the threshing machine or combine 10, adjacent its forward end, as best seen in Figure 1. Casing 31 includes the frame 32 which is adapted to be removably fastened to the thresher 10 by any suitable means, not shown. Rotatably mounted in frame 32 and casing 31 is the drum 33 which is keyed to the shaft 34 which is in turn journaled in the bearings 35 of the casing 31. Casing 31 is provided with the portion 36, corresponding in shape to the drum 34 and disposed to close the major portion thereof. Portion 36 is spaced from the periphery of the drum 33, as seen in Figure 2, and the inner side of this portion and the periphery of the drum 33 are provided with the corresponding serrated surfaces 37 for a purpose which will hereinafter be described.

Casing 31 is provided with the inclined passage 38 which connects at its lower end with the tailings auger 22, as best seen in Figure 1, to receive the tailings therefrom. Rotatably mounted in passage 38, adjacent its opposite ends, are the pulleys 39 carried by the shafts 40 and over which are trained an endless belt conveyor 41 having the outwardly projecting blades 42 adapted to receive the tailings for conveying them upwardly to the top of the passage 38 from whence they are released into the downwardly extending passage 43, forming a part of the casing 31. Passage 43 opens onto the exposed top part of the drum 34, as best seen in Figure 2.

As best seen in Figures 1 and 3, shaft 34 adjacent one end is provided with the pulley 44 over which is trained the belt 45 which is driven from one of the pulleys 30 to drive the drum 33 in the direction as indicated by the arrow 46 in Figure 1. Shaft 34 at its opposite end is provided with the pulley 47 which is connected to pulley 48, keyed to the shaft 40 of the upper roller 39, by the belt 49 which is crossed, as seen in Figure 3 to drive shaft 40 in the opposite direction for operating the endless belt 41 in the direction as indicated by the arrow 50, in Figures 1 and 2.

Casing 31 is provided with the chamber 51 which communicates at one end with the drum 33, directly beneath the passage 43. A revolving wiper 52 is mounted in this end of the chamber 51 and is carried by the shaft 53. Shaft 53, which is journaled in the casing 31, is provided at one end with the pulley 54 over which is trained the endless belt 55 which is likewise trained over a pulley 56, keyed to the shaft 34, for driving the wiper 52 in the same direction as the drum 33. The blades of the wiper 52 engage the serrated peripheries 37 just behind the passage 43 so that the portion of the periphery which has just been wiped by the blade moves into communication with passage 43.

At the lower end of the chamber 51 is provided a cylindrical passage 57, extending transversely of casing 31 and the threshing machine or combine 10, and in which is disposed the screw conveyor 58 carried by the shaft 59 provided with the pulley 60. Shaft 34 is provided with the pulley 61 connected to the pulley 60 by the belt 62 for driving the screw 58 in the direction as indicated by the arrow 58', in Figure 2. Passage 57 is provided with the depending portion 63 which extends downwardly along one side of the machine 10 and has its lower end turned inwardly to extend through the opening 64 and to discharge into the machine 10 above the grain conveyor 16.

The threshing machine or combine 10 is used for threshing clover or alfalfa as follows: The clover or alfalfa is fed by any suitable means, not shown, into the feed passage 11 from whence it passes into engagement with the threshing cylinder 12 which is moving in the direction as indicated by the arrow 65, in Figure 6, so that the heads of the alfalfa or clover are separated from the stalks as the clover or alfalfa passes between the concaves 13 and the cylinder 12 so that the heads may drop through the grill 14 and onto the pan 16. The stalks are carried off in the usual manner over the riddles 15 and are stacked in the conventional manner by the fan 26 and its blower pipe, not shown. The heads which drop onto the pan or conveyor 16 are directed therealong by the shaking action thereof imparted by the rocker arms 27 until they reach the screen 17. The loose seed and the heads drop through the screen 17 and onto the screen 18', while any dust or loose chaff is blown by the fan 23 back toward the fan 26. The screen 18', disposed beneath screen 17, separates the seeds from the heads and allows the seeds to drop through to the grain auger 21. The heads which are too large to pass through screen 18' are directed rearwardly by the draft from the fan 23 and into the tailings auger 22. Any heads which do not have to pass through screen 17 will drop through the screen 18 when blown by fan 23 toward fan 26, due to their weight, and these heads will likewise drop into the tailings auger 22. The operation of the parts which have up to this point been described is merely the normal operation of a conventional threshing machine or combine 10 and is not intended to be complete, but merely a description of the operation of the parts of machine 10 which function in conjunction with the removable attachment 28.

The tailings are directed by the auger 22 into the lower end of the elevator passage 38 where they are engaged by the blades or buckets 42 of the endless belt 41 and carried upwardly to the top of passage 38 where they are released into passage 43 to drop onto the exposed portion of the periphery of the drum 33. Drum 33, which as indicated by arrow 46, is revolving in a clockwise direction so that the tailings or heads are directed by the periphery of the drum into the space between the serrated faces 37 which are so spaced that the heads will be broken up by engagement therewith but will not be crushed. The heads by being broken up are divided into the seeds and chaff and is carried on by the drum 33 until it reaches the wiper 53 which brushes the seed and chaff into chamber 51, where it falls onto the auger or screw conveyor 58. Screw conveyor 58 carried the seed and chaff to the depending end 63 of the passage 57 where it drops by gravity downwardly along one side of the threshing machine or combine 10 and is released back onto the seed pan or conveyor 16, as heretofore described. The loose seed and chaff is again conveyed along the pan 16 until it reaches screen 17 where the seeds drop through onto screen 18' and through screen 18' to the grain auger. The chaff constituting the remaining portions of the heads is blown by fan 23 rearwardly to the blower 26 from whence it is discharged in the conventional manner.

Various modifications and changes in the construction and arrangement of the invention are contemplated and may obviously be resorted to, and the right is therefore expressly reserved to make such variations and changes as fall within the spirit and scope of the invention as hereinafter defined by the appended claims.

I claim as my invention:

1. An attachment for threshing machines or combines comprising a casing having a base adapted to be removably secured to the top of a threshing machine or combine, said casing including a concave portion mounted in said base, a drum rotatably mounted in the concave portion and partially enclosed thereby, an inclined passage, forming a part of said casing, having one end communicating with the tailing auger of the thresher or combine and its opposite end opening above said concave portion, an endless conveyor movable in said passage, a trough formed in said casing along one side of said concave portion and provided with a screw conveyor, a chute connecting with one end of the trough and having an outlet and opening into the thresher or combine, a wiper journaled in said casing, between the concave portion and trough for wiping the periphery of said drum, and power take off means for driving the drum, endless conveyor or screw conveyor, and wiper from a driven shaft of the thresher or combine.

2. A machine as in claim 1, said power take off means comprising a belt for driving the drum from said driving shaft, and a plurality of belts driven by the drum for driving the screw conveyor, endless conveyor, and wiper.

3. A machine as in claim 1, and an apron formed in said casing and extending from the upper end of said passage to a point adjacent the drum, said apron overlying the wiper.

HERMAN FANK.